(12) United States Patent
Jeuffe et al.

(10) Patent No.: US 8,898,849 B2
(45) Date of Patent: Dec. 2, 2014

(54) WINDSCREEN WIPER BLADE HAVING A BUILT-IN WASHER LIQUID CONDUIT

(75) Inventors: Gerard Jeuffe, Bazemont (FR); Brahim Hamza, Guilerand-Granges (FR); Jean-Michel Issartel, Romans sur Isere (FR); Akim-Driss Bouguerra, Villeurbanne (FR); Rodolphe Emaille, La Cote St Andre (FR)

(73) Assignees: Peugeot Citroen Automobiles SA (FR); MGI Coutier (FR)

( * ) Notice: Subject to any disclaimer, the term of this patent is extended or adjusted under 35 U.S.C. 154(b) by 0 days.

(21) Appl. No.: 13/511,544

(22) PCT Filed: Nov. 22, 2010

(86) PCT No.: PCT/FR2010/052483
§ 371 (c)(1),
(2), (4) Date: Aug. 16, 2012

(87) PCT Pub. No.: WO2011/061460
PCT Pub. Date: May 26, 2011

(65) Prior Publication Data
US 2012/0297564 A1    Nov. 29, 2012

(30) Foreign Application Priority Data

Nov. 23, 2009  (FR) .................................. 09 58272

(51) Int. Cl.
*B60S 1/38*    (2006.01)
*B60S 1/52*    (2006.01)

(52) U.S. Cl.
CPC .............. *B60S 1/524* (2013.01); *B60S 1/3894* (2013.01); *B60S 1/381* (2013.01); *B60S 1/3881* (2013.01); *B60S 1/3896* (2013.01)

USPC .................. 15/250.04; 15/250.01; 15/250.02; 15/250.201; 15/250.361

(58) Field of Classification Search
USPC ............. 15/250.04, 250.201, 250.43, 250.48, 15/250.16
See application file for complete search history.

(56) References Cited

U.S. PATENT DOCUMENTS

| 4,811,451 | A |   | 3/1989  | Roller |  |
|-----------|---|---|---------|--------|--|
| 5,842,251 | A | * | 12/1998 | LeFrançois et al. | ....... 15/250.04 |
| 6,092,259 | A | * | 7/2000  | Reppert | ..................... 15/250.04 |
| 6,119,300 | A | * | 9/2000  | Schmid et al. | ............. 15/250.04 |
| 6,836,924 | B2 | * | 1/2005 | Egan-Walter | .............. 15/250.04 |

(Continued)

FOREIGN PATENT DOCUMENTS

DE    7005624          6/1970
EP    1918167 A1       5/2008

(Continued)

OTHER PUBLICATIONS

International Search Report from corresponding PCT/FR2010/052483 mailed Mar. 2, 2011.

*Primary Examiner* — Monica Carter
*Assistant Examiner* — Michael Jennings
(74) *Attorney, Agent, or Firm* — Polster Lieder

(57) ABSTRACT

The invention relates to a windshield wiper blade of a motor vehicle, comprising an elongate flexible strip, wherein at least one end of the strip is covered by a cap with a built-in conduit provided with a nozzle offset on the side of the flexible strip relative to the longitudinal median plane of said flexible strip.

9 Claims, 2 Drawing Sheets

(56) References Cited

U.S. PATENT DOCUMENTS

| | | | |
|---|---|---|---|
| 7,373,688 B2 * | 5/2008 | Aoyama et al. | 15/250.201 |
| 7,793,381 B2 * | 9/2010 | Yon | 15/250.04 |
| 7,836,541 B2 * | 11/2010 | Harita et al. | 15/250.04 |
| 2003/0019066 A1 | 1/2003 | Egner-Walter | |
| 2008/0216274 A1 * | 9/2008 | Egner-Walter et al. | 15/250.02 |
| 2008/0263806 A1 * | 10/2008 | Egner-Walter et al. | 15/250.01 |
| 2009/0172907 A1 * | 7/2009 | Egner-Walter et al. | 15/250.01 |
| 2011/0047738 A1 * | 3/2011 | Gross et al. | 15/250.04 |

FOREIGN PATENT DOCUMENTS

| | | | |
|---|---|---|---|
| FR | 2603850 A1 * | 3/1988 | B60S 1/38 |
| FR | 2648771 A1 | 12/1990 | |
| FR | 2933933 A1 | 1/2010 | |
| GB | 410259 A | 5/1934 | |
| WO | WO 2009118286 A1 * | 10/2009 | |

* cited by examiner

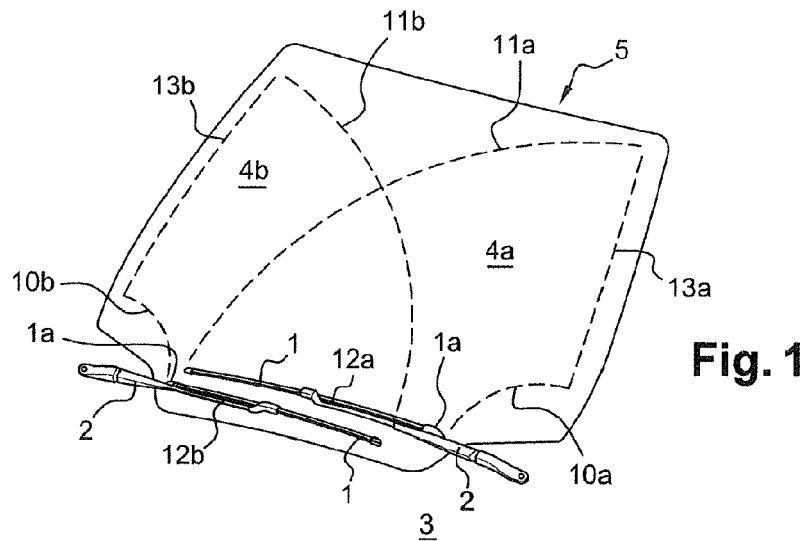
Fig. 1
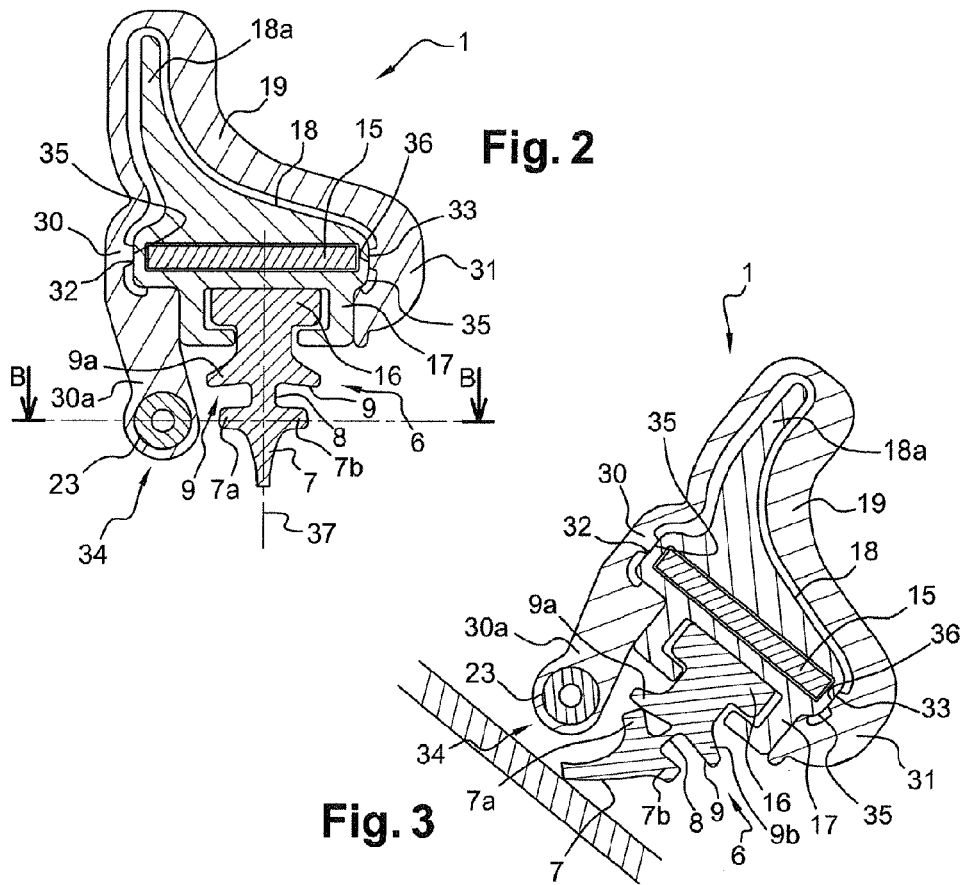
Fig. 2
Fig. 3

WINDSCREEN WIPER BLADE HAVING A BUILT-IN WASHER LIQUID CONDUIT

CROSS-REFERENCE TO RELATED APPLICATIONS

This application is a National Stage of International Application No. PCT/FR2010/052483, filed Nov. 22, 2010, which claims priority to French application 0958272, filed on Nov. 23, 2009, the content of which (text, drawings and claims) is incorporated herein by reference.

FIELD

The present invention relates to a windshield wiper blade that includes in at least one of its extremities a conduit equipped with a nozzle integrated in the cap of the windshield wiper blade.

BACKGROUND

Typically, cleaning of the windshield or the rear window of a vehicle normally occurs by spraying washer fluid on the glass surface by means of nozzles installed on the hood of the vehicle or on the cowl grille of the vehicle. These nozzles, installed at a distance from the glass surface to be cleaned, require very delicate adjustment in order to obtain an effective spray. These so-called fluidic nozzles project washer fluid in the form of spray on most of the glass surface. This washing operation uses a significant fluid volume and masks during a few seconds the visibility of the driver. Consequently, this operation could turn out to be very dangerous because of the potential risks that it can imply. In addition, the jet projection varies depending on the speed of the vehicle, for instance, at high speed, the jet is projected only on the lower portion of the glass surface which results of course in insufficient cleaning of said glass surface. Furthermore, wash systems are typically designed for each type of vehicle, which entails significant development costs.

In all cases, the washer fluid is projected directly on the glass surface ahead of the wiper blade either in the form of spray, or in the form of projection, distributed in irregular and discontinuous patches.

In the state of technology, we know in particular document DE 1755762, describing a washer fluid projection device in connection with a windshield wiper mechanism. The mechanism comprises a mobile mounted windshield wiper blade, sweeping the glass surface, and comprising the traditional longitudinal support assembly and a wiper blade.

The projection device consists of an arm on which the wiper is mounted and is adapted to the wiper so that the washer fluid is projected in the form of a jet in front of the lip of the wiper blade relative to its sweeping movement.

Document FR291 671 6 describes an arrangement for a washer fluid projection device. The washer fluid projection nozzle is placed at the end and on the outside of the wiper blade, precisely in the axis of its median part in order to spray alternatively, during its sweeping movement, a fluid jet on the glass surface in front of the wiper lip.

Document EP 0860336 describes a wiper blade connected in traditional manner to a mobile sweeping arm to clean a glass surface. The wiper blade comprises a lip in its lower part and a means to mount to a frame in its upper part, and a channel extending longitudinally in the interior of the wiper blade, in order to carry washer fluid to an end piece in each of the extremities of the wiper blade. This end piece has a supply nipple for fluid introduced in the channel of the wiper blade. The supply nipple is positioned in the axis of the end piece comprising end pieces in the form of inverse V conduits, whereby the exit nozzles in the extremities of the wiper blade are directed facing each other, in order to deliver a jet in the form of spray at a variable distance from the wiper blade depending on the angle of the V, on the glass surface on both sides of the wiper blade, whereby the jets cross each other in the plane passing through the lengthwise middle of the wiper blade.

SUMMARY

The goal of the invention is to provide a windshield wiper blade and a washing and wiping device that eliminates these inconveniences in particular by eliminating tedious adjustments and by ensuring a marked visibility improvement for the driver during the washing and wiping operation of the glass surface.

To this end, the invention comprises positioning a nozzle at the exit of a conduit as close as possible to a lip of the wiper blade, by incorporating the conduit in the cap of a windshield wiper blade. Prior to its return, the lip of the windshield wiper blade forms a concavity over its whole length, and the cylindrical jet of washer fluid emitted by the nozzle is distributed uniformly in the concavity over the major portion of the wiper blade lip of the windshield wiper blade. After returning, the liquid distributed evenly between the lip of the windshield wiper blade and the glass surface allows for optimized wiping and cleaning without hindering the visibility of the driver.

For this purpose, an automotive vehicle windshield wiper blade of the invention comprises a flexible elongated wiper blade, wherein in that at least one extremity of the wiper blade is covered by a cap integrating a conduit provided with a nozzle, which is offset on the side of the lip of the flexible wiper blade relative to a median longitudinal plane of the flexible wiper blade.

In various implementations, the axis of the nozzle is arranged parallel to the lip of the wiper blade so that it directs the washer fluid to the lip of the wiper blade when the wiper blade is in a stop position, before returning for wiping of the glass surface, in order to send the washer fluid in the concavity of the lip of the wiper blade and evenly distributing it over its whole length.

In other implementations, the axis of the nozzle is oriented in the direction of the lip of the wiper blade so that it directs the washer fluid to the lip of the wiper blade when the latter is in its stop position, before returning for wiping of the glass surface, which allows for optimizing the direction of the jet during the supply of washer fluid.

In yet other implementations, the cap comprises two dissymmetric legs, relative to the median plane of the lip of the wiper blade, so that the conduit can be incorporated in the longest leg.

In still other implementations, the conduit is arranged in the extended lower portion of the cap leg so that the exit orifice of the nozzle is positioned in the vicinity of the lip of the wiper blade and the offset conduit is more advantageously positioned on the edge of the wiper blade.

In still yet other implementations, the cap leg carrying the nozzle extends in the vicinity of the lip of the wiper blade, so that the nozzle can be placed and oriented in the most accurate manner relative to the lip of the wiper blade.

In other implementations, the connector is protruding so that it extends from the bottom of the cap for connection of the washer fluid supply, which facilitates the assembly of the canalization.

In yet other implementations, the connector is made in one piece with the cap, making it easier to fabricate.

In yet still other implementations, the nozzle is completely situated inside the conduit, which avoids untimely misadjustments due to shock or contact of the protruding nozzle.

In still further implementations, the conduit receiving the nozzle comprises a chamfer flared towards the exit and flush on the side of the leg so that the flow of washer fluid is improved.

In various other embodiments, the invention relates to a washing and wiping device comprising at least one windshield wiper blade for a glass surface.

In yet other embodiments, the invention comprises an automotive vehicle comprising at least one washing and wiping device for a glass surface.

DRAWINGS

Other characteristics of the windshield wiper blade constructed according to the invention, will become clear through the following description of several implementation examples given as non limiting illustrations with reference to the attached drawings.

FIG. 1 is a perspective view of a washer and wiper assembly for a glass surface according to the invention, in an inactive position.

FIG. 2 is a cross sectional view along line A-A of FIG. 4 of a windshield wiper blade equipped with a support and a nozzle according to the invention whereby the lip of the wiper blade is shown in a neutral position in the median longitudinal plane.

FIG. 3 is a cross sectional view along line A-A of FIG. 4 of a windshield wiper blade resting on a glass surface according to the invention.

DETAILED DESCRIPTION

Figure 4:
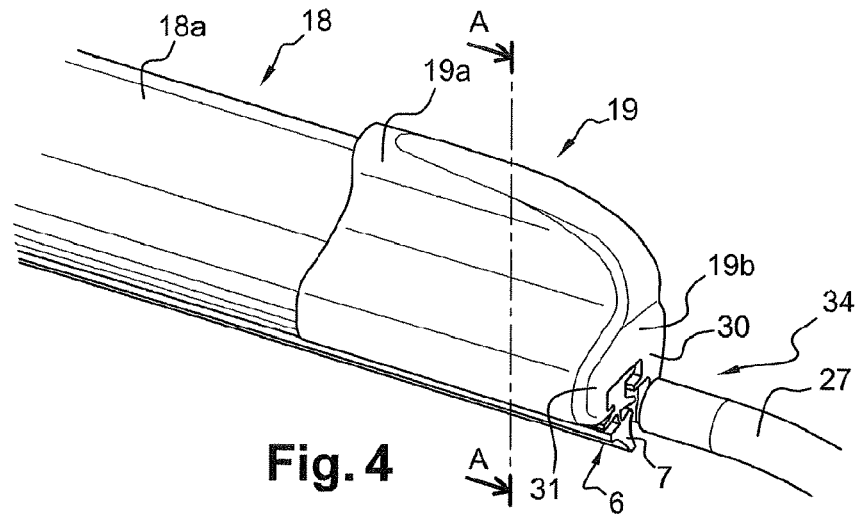
FIG. 4 is a perspective view of an extremity of a windshield wiper blade equipped with a cap according to the invention.

FIG. 1 shows a perspective view of an assembly for washing and wiping a glass surface comprising a pair of windshield wiper blades according to the invention, in an inactive position. In this view the windshield wiper blades 1 are mounted in a traditional manner on the distal end of an arm 2 by means of an articulation arranged in the median part of the windshield wiper blade 1. At the proximal end the arms 2 are mounted on a motorized means connected to the vehicle body 3 so that the wiper blades travel simultaneously over the zones to be wiped 4a and 4b on the glass surface such as for instance a windshield 5. In FIG. 1, the windshield wiper blades 1 are shown in an inactive position, e.g., in a position parallel to each other and approximately parallel to the lower edge of the windshield 5. The windshield wiper blades 1 shown in FIG. 1 are called antagonists because they move in opposite directions relative to each other. The windshield wiper blades 1 can also move parallel relative to each other, or only one windshield wiper blade 1 can be arranged to wipe a zone of the windshield, or the rear window, or the headlights. All these wiping variants do not affect in any way the operating principle of the windshield wiper blade 1 according to the invention, which will be described below. The windshield wiper blades 1 shown in FIG. 1 comprise at their lower extremities, in a suitable end piece 1a, and positioned in parallel to the wiper blade 6 (shown in FIG. 2) of the windshield wiper blade 1, a conduit 23 (shown in FIG. 2) equipped with a nozzle 24 (shown in FIG. 6), placed on the side of the zone to be wiped so that a jet of washer fluid can be delivered to a lip 7 (shown in FIG. 2) of the wiper blade 6 of the windshield wiper blade 1. End piece 1a is also referred to herein as cap 19. The nozzles 24 placed in the lower part of the windshield wiper blades 1 define, relative to the axis of rotation of the arm 2, a small radius 10a and 10b when sweeping the zone to be wiped 4a and 4b, while the upper extremity of the windshield wiper blades 1 define a large radius 11a and 11b. The travel of the windshield wiper blades 1, between positions 12a and 12b, parallel to the internal edge of the windshield, and positions 13a and 13b, approximately parallel to the lateral edge of the windshield, defines the zones to be wiped 4a and 4b. A nozzle could also be mounted in the upper extremity of the windshield wiper blade 1, facing the nozzle 24 located in the lower extremity, in other words located on the side of the zone to be wiped when the blade is at the end of travel, in other words, in its vertical position when the blade is approximately parallel to the lateral edge of the windshield 5.

In order to integrate harmoniously the conduit 23 equipped with the nozzle 24 in the windshield wiper blade 1 of an automotive vehicle, the conduit 23 equipped with the nozzle 24 is incorporated in a cap 19. In this way, in an operating phase, the windshield wiper blade 1 comprising a flexible, elongated, wiper blade 6, is resting perpendicularly on the glass surface to be swept, e.g., the surface of the windshield 5 or a rear window of a vehicle. End cap 19 incorporates the conduit 23 equipped with the nozzle 24, which is offset at a certain distance relative to longitudinal median axis of the wiper blade 6. The offset distance is such that the washer fluid is projected on the majority of the length of lip 7 of wiper blade 6 of windshield wiper blade 1. In other words, the position of the conduit 23 equipped with its nozzle 24 is rigorously located relative to the lip 7 of the wiper blade 6 so that, in the inactive position on a glass surface, the concavity of the lip 7 is facing the nozzle 24, as illustrated in FIG. 3.

FIG. 2 is cross sectional view along line A-A in FIG. 4 of the windshield wiper blade 1 equipped with a support and a nozzle according to the invention, showing the lip 7 of the wiper blade 6 in a neutral position in the median longitudinal plane.

The windshield wiper blade 1 illustrated in FIG. 2, comprises essentially the flexible, elongated, wiper blade 6, made of rubber or similar material suitable to be used for cleaning the glass surface against which rests lip 7 of wiper blade 6, e.g., the surface of the front windshield 5 or the rear window of an automotive vehicle.

This glass surface visible in FIG. 1 usually has a more or less pronounced curvature, according to the surface traveled by the windshield wiper blade 1 during its displacements while in contact with the glass surface, against which the windshield wiper blade 1, according to the invention, complies perfectly. In the inactive position, lip 7 of wiper blade 6 resting horizontally, in longitudinal direction, on windshield 5, which is mounted in the car body in an inclined position, forms an upward oriented concavity over its length, as shown in FIG. 3. In this configuration, a heel 7a of the lip 7 comes in contact with a shoulder 9a of a base 9 of wiper blade 6. The windshield wiper blade 1 commonly consists of the wiper blade 6 comprising in its lower end the lip 7 articulated around a hinge 8 and in its upper end a frame 18 supporting wiper blade 6, reinforced by a rib 15 disposed within the polymer frame 18. Wiper blade 6 has in its upper part a tendon 16 which is inserted in a mortise 17 formed in the lower part of frame 18. This frame 18 has a wall which becomes progressively thinner in a vertical plane to form a deflector 18a. Frame 18 comprises connection means (not shown) articulated to arm 2. In order to improve the overall appearance of the windshield wiper blade 1, embellishing caps 19 are mounted on each of the extremities of the windshield wiper blade. Caps 19 cover the extremities of frame 18 and partially wiper blade 6 in order to reinforce the perceived quality. The axis of conduit 23 is positioned parallel to the axis of wiper blade 6, at a distance from it, so that it is facing the concavity of lip 7 of wiper blade 6 when the wiper blade is in inactive position (visible on FIG. 3). The caps 19 have the general form of the profile of frame 18 on which they fit in each extremity. In particular, their lower parts consist of two C shaped legs 30 and 31 facing each other and used to guide and to enclose the sliding part of frame 18. Protuberances 32 and 33 are arranged in the hollows of the C's to exercise clamping pressure on the flanks 35 and 36 of frame 18 during the sliding assembly of caps 19. Leg 30 is extended by a lower part 30a and incorporates, with precise orientation and in suitable manner for the position of lip 7 of wiper blade 6, a conduit and nozzle assembly 34. This assembly 34 allows for the delivery of a washer fluid jet on lip 7 of wiper blade 6 of the windshield wiper blade 1. Because of the precise guiding of the cap 19 when it is assembled on the windshield wiper blade 1, the conduit and nozzle assembly 34 is positioned in offset manner and very precisely relative to lip 7 of wiper blade 6.

FIG. 2 shows the windshield wiper blade 1 with wiper blade 6, in a neutral position, in other words in a position whereby the windshield wiper blade 1 is not resting against the glass surface of the windshield 5 or when it is not mounted on the arm 2 and is not subject to any stress or load, in particular lip 7 of wiper blade 6 is positioned in the median longitudinal plane of said wiper blade 6, symbolized by axis 37.

FIG. 3 is a cross sectional view of the windshield wiper blade 1 according to the invention shown in inactive position when positioned on glass surface of the windshield 5. This glass surface of the windshield 5 usually has a more or less pronounced curvature, according to the surface traveled by the windshield wiper blade 1 during its displacements while in contact with the glass surface, against which the windshield wiper blade 1 according to the invention perfectly complies. As described above, in the inactive position, lip 7 of wiper blade 6 resting horizontally in longitudinal direction against windshield 5, which is mounted in the car body in inclined position, forms an upward oriented concavity over its length. In this configuration, heel 7a of lip 7 comes in contact with shoulder 9a of base 9 of wiper blade 6. The windshield wiper blade 1 commonly consists of the wiper blade 6 comprising in its lower part the lip 7 articulated around the hinge 8 and in its upper part the frame 18 supporting the wiper blade 6, which is reinforced by the rib 15 disposed in the polymer frame 18. When the wiping movement is reversed, lip 7 of wiper blade 6 rotates around hinge 8. As illustrated in FIG. 3, the wiper blade 6 is in its stop and rest position prior to returning. As soon as the wiping starts, lip 7 of wiper blade 6 will rotate and heel 7b of lip 7, will come in contact with shoulder 9b of base 9 of wiper blade 6.

FIG. 4 is a perspective view of the extremity of a windshield wiper blade 1 equipped with the cap 19 according to the invention. FIG. 4 shows the sliding part of the windshield wiper blade 1, comprising frame 18 and its deflector 18a and wiper blade 6 with lip 7. Cap 19 covers the extremity of frame 18 and also includes the beginning of a deflector 19a, which connects by a harmonious curvature with its extremity closed by a bottom 19b. Leg 31 of cap 19 encloses frame 18, while the other leg 30 also encloses the frame 18 but is prolonged in its lower part to receive the conduit 23 and nozzle 24 of assembly 34. FIG. 4 illustrates a canalization 27 which brings the washer fluid to the nozzle 24. This arrangement integrating the conduit and nozzle assembly 34 in cap 19 allows for the elimination of tedious adjustments and for the removal of cap 19 from an old used windshield wiper blade 1 and reinstallation on a new windshield wiper blade 1 during the replacement of the used windshield wiper blade 1. It is evident from the FIG. 4 that this operation is very easy to perform, since the wiper blade 6 is easily viewed through an opening visible in the extremity of cap 19.

Figure 5:
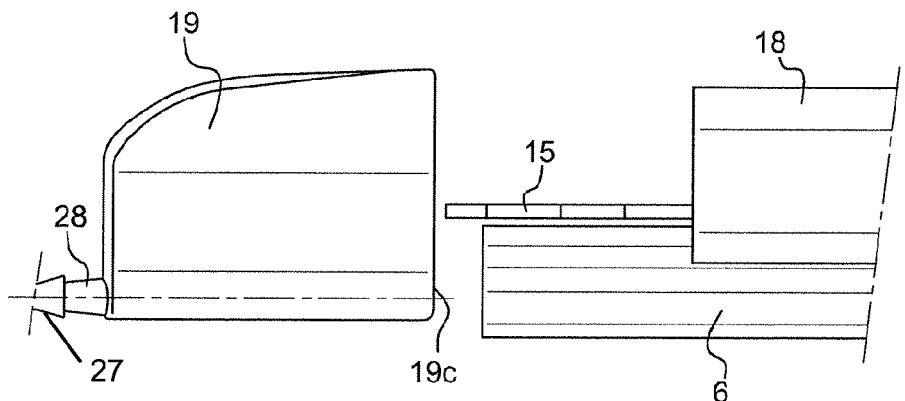
FIG. 5 is an exploded view of the extremity of the windshield wiper blade equipped with the cap according to the invention.

FIG. 5 is an exploded view of the extremity of the windshield wiper blade 1 equipped with the cap 19 according to the invention. This view shows how parts are assembled on the extremity of a windshield wiper blade 1, comprising respectively the frame 18, and functionally protruding from the frame, the rib 15 reinforcing wiper blade 6. Cap 19 is covering the extremity of the assembly including the frame 18, the rib 15 and the wiper blade 6. For this purpose, the extremity of wiper blade 6 serves as a guiding means in order to engage cap 19 by simple sliding, as described previously. Lastly, the canalization 27 is connected to conduit 23 via a connector 28.

Figure 6:
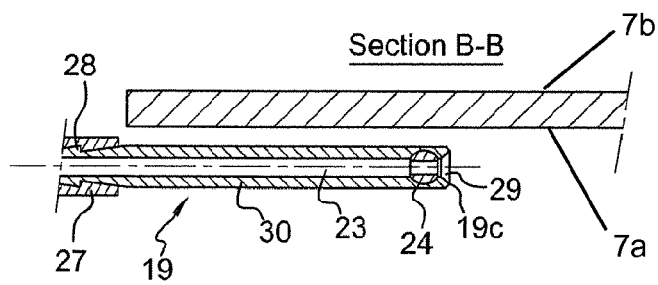
FIG. 6 is a top view of a cross section along line B-B in FIG. 2 of the extremity of the windshield wiper blade equipped with the cap showing the detail of a conduit equipped with a nozzle according to the invention.

FIG. 6 is a top cross sectional view along line B-B of FIG. 2 of the extremity of the windshield wiper blade 1 equipped with a cap 19, showing the detail of the conduit 23, equipped with the nozzle 24 according to the invention, disposed within leg 30 of cap 19. In this view, it is shown that conduit 23 and nozzle 24, with spherical form, are perfectly integrated within leg 30 of cap 19, while a chamfer 29 is uniquely provided at the exit of nozzle 24. No other element or supplementary part is protruding from the extremity of leg 30 such that the fluid jet is undistributed towards wiper blade 6. At the other extremity of leg 30, protruding connector 28 allows for connecting the canalization 27, transferring the washer fluid towards the nozzle 24, via the conduit 23.

Although the cap 19 is shown throughout the various Figures as being mounted in the lower extremity of the frame 18 of the windshield wiper blade 1, it is envisioned that this concept can likewise be applied to the cap covering the upper extremity of frame 18 of windshield wiper blade 1, of course taking into account the effects of symmetry.

The windshield wiper blade 1 according to the invention brings together in a single concept the washing and wiping functions, while preserving a noteworthy perceived quality. This concept allows for washing and wiping the windshield 5 at discretion and efficiently while improving the visibility of the driver.

It is to be understood that the invention is not limited to the exemplary embodiments described and shown in detail herein.

The invention claimed is:

1. A windshield wiper blade assembly of an automotive vehicle, said windshield wiper blade assembly comprising:
    an elongated flexible wiper blade;
    a frame in which the wiper blade is retained, the frame having a deflector side structured to deflect wind and an opposing back side; and
    an end cap having a length shorter than a length of the frame, the end cap removably disposed over and enclosing a longitudinal end portion of the frame, the cap having a first leg disposed over the deflector side of the longitudinal end portion of the frame and an elongated second leg disposed over the back side of the longitudinal end portion of the frame, the second leg having a lower part extending downward, substantially coplanar with the frame back side, beyond the back side of the longitudinal end portion of the frame such that a distal end of the second leg is adjacent a longitudinal end portion of a lip of the wiper blade, the second leg having a conduit integrated in the distal end thereof such that the conduit is disposed adjacent the longitudinal end portion of the lip of the wiper blade and a nozzle fluidly connected to the conduit, the nozzle offset on the frame back side of the longitudinal end portion of the lip of the wiper blade relative to a median longitudinal plane of wiper blade and structured and operable to dispense washer fluid into and along a concavity of the wiper blade.

2. The windshield wiper blade according to claim 1, wherein an axis of the nozzle is disposed parallel to the lip of wiper blade so as to emit a cylindrical jet of washer fluid and direct the cylindrical jet of washer fluid into and along the concavity of the lip of wiper blade when the wiper blade is in a stop position, prior to returning during wiping of the glass surface of the vehicle.

3. The windshield wiper blade according to claim 1, wherein an axis of the nozzle is oriented in the direction of the lip of the wiper blade in order to direct the washer fluid into and along the concavity of the lip of wiper blade when the wiper blade is in a stop position, prior to returning during wiping of the glass surface of the vehicle.

4. The windshield wiper blade according to claim 1, wherein the cap includes a connector protruding from a bottom of the cap.

5. The windshield wiper blade according to claim 4, wherein the connector is constructed of the same material as the cap.

6. The windshield wiper blade according to claim 1, wherein the nozzle is disposed within the conduit.

7. The windshield wiper blade according to claim 1, wherein the nozzle comprises a chamfer flaring towards an exit of the nozzle and flush with a side of the second leg of the cap.

8. A device for washing and wiping a glass surface of an automotive vehicle, said device comprising:
   a windshield wiper blade assembly, said windshield wiper blade assembly comprising:
      an elongated flexible wiper blade;
      a frame in which the wiper blade is retained, the frame having a deflector side structured to deflect wind and an opposing back side; and
      an end cap having a length shorter than a length of the frame, the end cap removably disposed over and enclosing a longitudinal end portion of the frame, the cap having a first leg disposed over the deflector side of the longitudinal end portion of the frame and an elongated second leg disposed over the back side of the longitudinal end portion of the frame, the second leg having a lower part extending downward, substantially coplanar with the frame back side, beyond the back side of the longitudinal end portion of the frame such that a distal end of the second leg is adjacent a longitudinal end portion of a lip of the wiper blade, the second leg having a conduit integrated in the distal end thereof such that the conduit is disposed adjacent the longitudinal end portion of the lip of the wiper blade and a nozzle fluidly connected to the conduit, the nozzle offset on the frame back side of the longitudinal end portion of the lip of the wiper blade relative to a median longitudinal plane of wiper blade and structured and operable to dispense washer fluid into and along a concavity of the wiper blade.

9. An automotive vehicle, said vehicle comprising
   a device for washing and wiping a glass surface of the vehicle, said device comprising:
      a windshield wiper blade assembly, said windshield wiper blade assembly comprising:
         an elongated flexible wiper blade;
         a frame in which the wiper blade is retained, the frame having a deflector side structured to deflect wind and an opposing back side; and
         an end cap having a length shorter than a length of the frame, the end cap removably disposed over and enclosing a longitudinal end portion of the frame, the cap having a first leg disposed over the deflector side of the longitudinal end portion of the frame and an elongated second leg disposed over the back side of the longitudinal end portion of the frame, the second leg having a lower part extending downward, substantially coplanar with the frame back side, beyond the back side of the longitudinal end portion of the frame such that a distal end of the second leg is adjacent a longitudinal end portion of a lip of the wiper blade, the second leg having a conduit integrated in the distal end thereof such that the conduit is disposed adjacent the longitudinal end portion of the lip of the wiper blade and a nozzle fluidly connected to the conduit, the nozzle offset on the frame back side of the longitudinal end portion of the lip of the wiper blade relative to a median longitudinal plane of wiper blade and structured and operable to dispense washer fluid into and along a concavity of the wiper blade.

* * * * *